United States Patent [19]
Hilton

[11] 4,346,134
[45] Aug. 24, 1982

[54] HONEYCOMB CORE ASSEMBLY INCLUDING A SACRIFICIAL CORE PORTION

[75] Inventor: R. John Hilton, Auburn, Wash.

[73] Assignee: The Boeing Company, Seattle, Wash.

[21] Appl. No.: 191,737

[22] Filed: Sep. 29, 1980

Related U.S. Application Data

[62] Division of Ser. No. 164,437, Jun. 30, 1980.

[51] Int. Cl.³ .............................................. B32B 3/12
[52] U.S. Cl. ................................... 428/116; 156/154; 156/267
[58] Field of Search .............................. 156/197–267, 156/154; 428/116, 117, 118; 29/423–424; 228/181

[56] References Cited

U.S. PATENT DOCUMENTS

| | | | |
|---|---|---|---|
| 3,060,561 | 10/1962 | Watter | 29/423 |
| 3,064,345 | 11/1962 | Herman et al. | 428/117 X |
| 3,407,110 | 10/1968 | Axelson et al. | 428/117 X |
| 3,413,708 | 12/1968 | Norville et al. | 428/116 X |
| 3,566,493 | 3/1971 | Poucher et al. | 428/116 X |
| 3,740,301 | 6/1973 | Manning et al. | 428/116 X |
| 4,284,443 | 8/1981 | Hilton | 156/197 X |

Primary Examiner—Henry F. Epstein
Attorney, Agent, or Firm—Conrad O. Gardner; Nicolaas DeVogel; Bernard A. Donahue

[57] ABSTRACT

A sandwich assembly, e.g. an aluminum honeycomb sandwich assembly such as an inboard slat trailing edge for use in an aircraft wherein the spar cap spacing accuracy is retained through break-away tooling, e.g. a strip of low density core machined to the leading edge contour of the honeycomb core during core manufacture.

2 Claims, 8 Drawing Figures

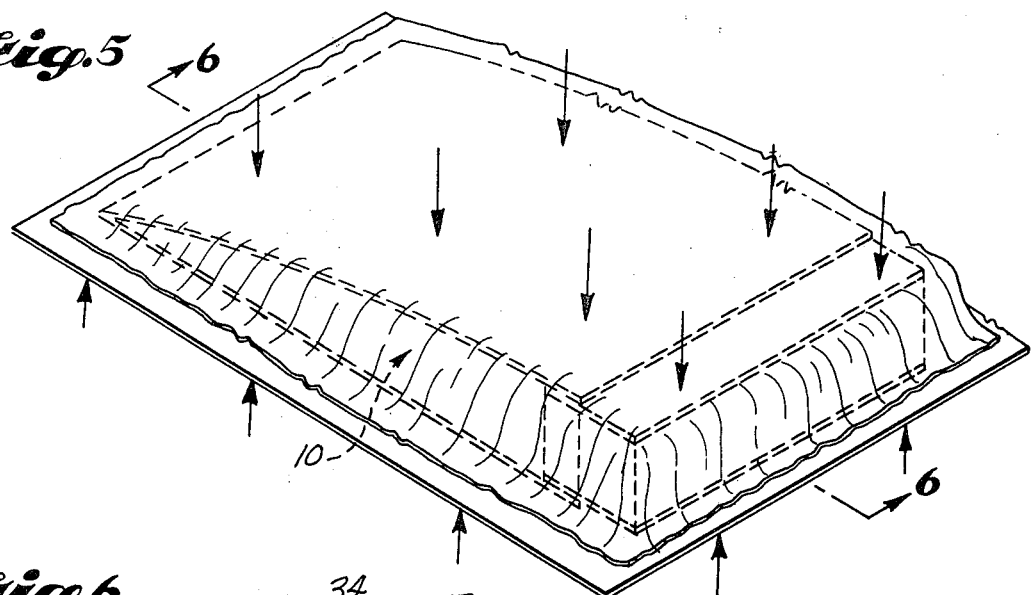
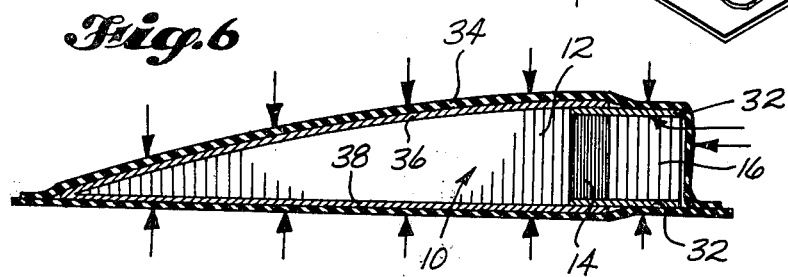
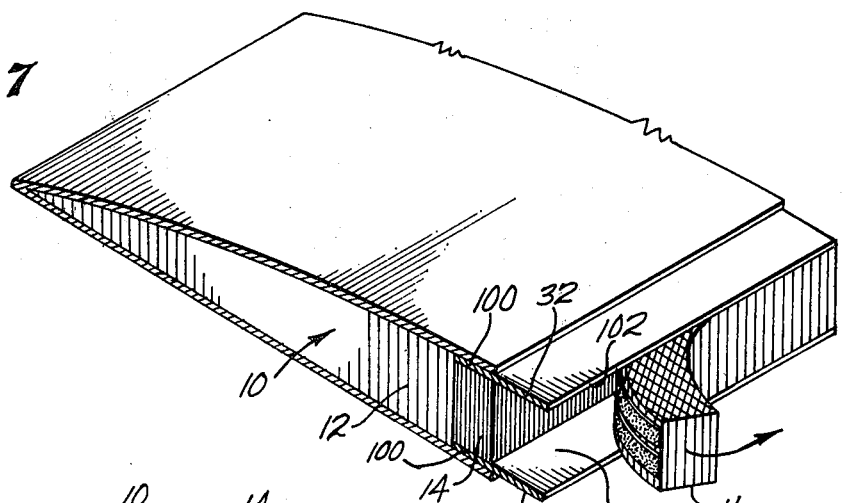
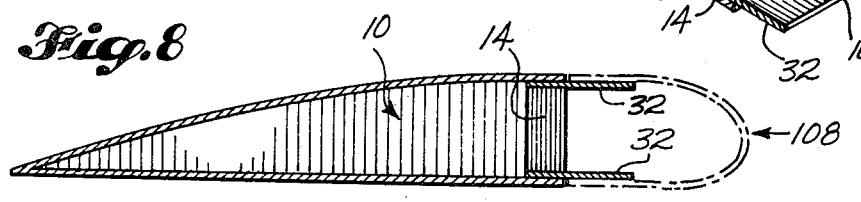

HONEYCOMB CORE ASSEMBLY INCLUDING A SACRIFICIAL CORE PORTION

This is a division of application Ser. No. 164,437, filed June 30, 1980.

This invention relates to a method of making sandwich panel structures and more particularly to a method of machining honeycomb core prior to sandwich panel assembly.

Heretofore, in accordance with present tooling concepts for either conventional or sparless sandwich assemblies, machining of a mandrel or holder which exactly fits an extruded or machined edge member is required. Such tooling concepts make long tapered or curved sections especially difficult. Lack of capability in such efforts has slowed, if not stifled, efforts to utilize preferred aerodynamic shapes on lift and control surfaces. Proper pressure transmission from the upper to the lower sandwich surface is usually lacking with the conventional mandrel.

In the patent literature, U.S. Pat. No. 3,064,345 issued Nov. 20, 1962, U.S. Pat. No. 3,060,561 issued Oct. 30, 1962, and U.S. Pat. No. 3,413,708 issued Dec. 3, 1968 relate to some temporary holding or stabilizing means utilized during the fabrication of honeycomb-type workpieces. Aforementioned U.S. Pat. No. 3,060,561 teaches the use of a solid section or spacer positioned along the edge of a sandwich structure, not of the honeycomb type, prior to the forming of a curved section, the edge member being removed after processing.

In contrast, it is an object of the present invention to provide sacrificial honeycomb core structures prior to a machining step in manufacturing sandwich or wedge structures.

It is a further object of this invention to provide machinable, removable honeycomb core structure for insuring correct primary core height in a subsequent method step for bonding of nesting face sheets to the primary core.

It is yet a further object of this invention to provide temporary edge bonding of a honeycomb core section to a higher density primary core section prior to a machining step in the manufacture of flat honeycomb core sandwich structure or wedge structure.

It is still another object of the present invention to provide means for temporarily attaching a honeycomb core portion to a higher density honeycomb core portion prior to the machining step of a process for manufacturing and assembling a sandwich structure which includes the higher density honeycomb core portion and not the temporarily attached honeycomb core portion in the finished assembly.

The invention will be best understood by reference to the accompanying drawings illustrative of an exemplary embodiment of the method, wherein:

FIG. 5 is a perspective view showing parting film location with respect to sacrificial core during assembly of components including spar cap and skin on the core blank;

FIG. 6 is a section of the assembly of FIG. 5 showing components of the assembly in more detail;

FIG. 7 is a perspective view of the assembly of FIGS. 5 and 6 showing removal of sacrificial core after cure and debagging; and FIG. 8 is a side sectional view of the assembly of FIG. 7 shown subsequent to assembly of bull nose to to the trailing edge portion of the wedge structure assembly.

Figure 1:
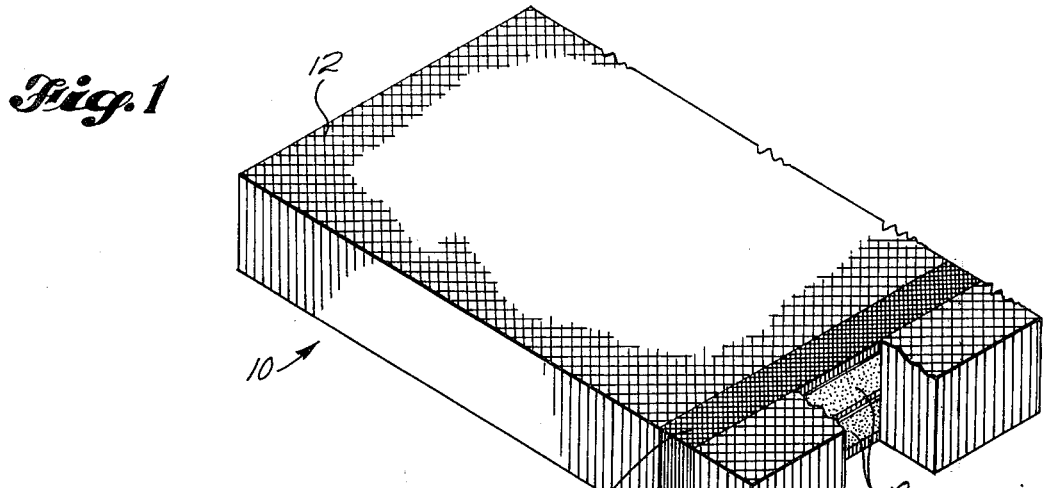
FIG. 1 is a view in perspective of a core blank prior to machining showing make up thereof including sacrificial core portion.
Figure 3:
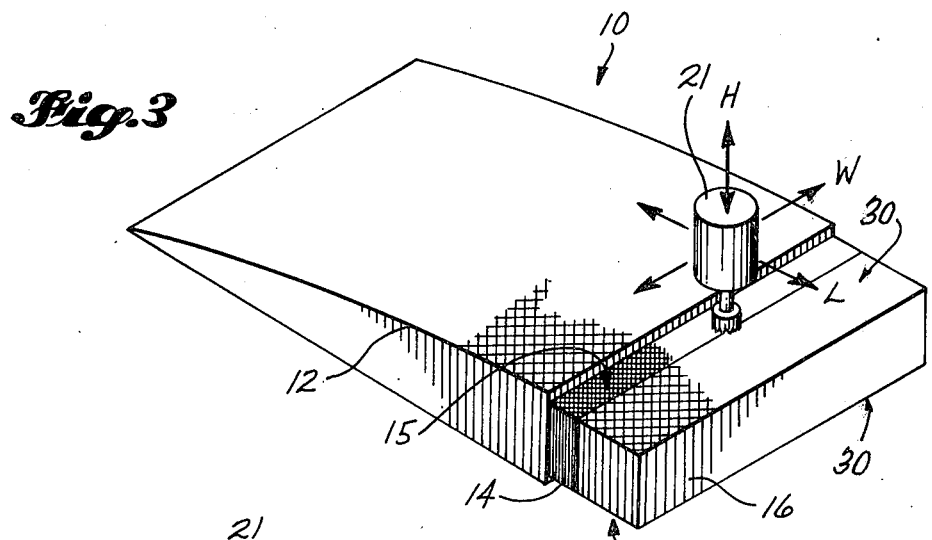
FIG. 3 is illustrative of the machining step wherein the sacrificial core is machined to the same dimension as the high density portion of the core blank.

Turning now to FIG. 1, it can be seen that honeycomb core blank 10 is shown to include a low density portion 12, a high density portion 14, and a further low density sacrificial core portion 16 attached by temporary fastening means 18 comprising e.g. double-backed tape, contact adhesive or other means enabling low density sacrificial core portion 16 to be retained during the machining step of FIG. 3 while separated in the step shown in FIG. 7. In a side view of honeycomb core blank 10, high density core portion 14 can be seen intermediate low density portions 12 and 16, low density portion 16 forming the sacrificial core portion which remains firmly attached to high density core portion 14 via temporary fastening means 18 until final break away thereof in the step of FIG. 7.

Figure 2:
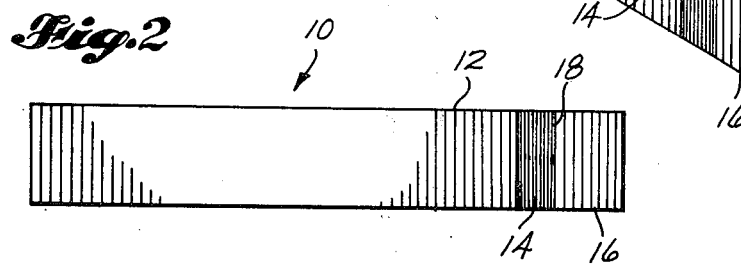
FIG. 2 is a side view of the core blank of FIG. 1 showing low density, high density, and sacrificial core portion of the core blank.
Figure 4:
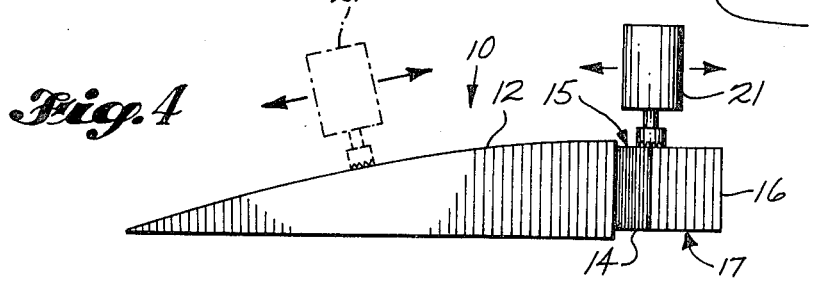
FIG. 4 is a side view of the machining step being performed in FIG. 3.

Honeycomb blank assembly 10 shown in FIGS. 1 and 2 is shown in FIG. 3 and in side view in FIG. 4 being machined to desired height H, width W and length L. In this manner, it should be further noted that sacrificial honeycomb core portion 16 is machined to exactly the same dimension in height H and width W as higher density honeycomb core portion 14 of honeycomb core blank 10 thereby assuring no mismatch in a subsequent bonding operation. The upper core surface 15 which is recessed at the forward edge by machining as shown in FIGS. 3 and 4 is shimmed (not shown) to prevent deflection when core blank 10 is inverted to machine opposite surface 17. Sacrificial core portion 16 is secured adequately by temporary fastening means 18 and thus not permitted to move relative to higher density honeycomb core portion 14 during this machining operation by e.g. movement of routing means 21 to provide the desired predetermined dimensioning of honeycomb core blank 10.

Subsequent to the achievement of desired dimensions, a plastic film or other separator, e.g. Teflon film, a synthetic resin polymer is placed over outer surfaces 30 of sacrificial honeycomb core portion 16 which interface with the inner surfaces of spar cap members 32 to prevent later bonding between surfaces 30 and spar cap member 32. An adhesive is placed over the remaining outer surface of honeycomb core 10 prior to assembly of the components to core 10, those components including spar caps (splice plates) 32 and outer upper and lower aluminum skin portions 36 and 38. Once assembly of components to honeycomb core 10 has been completed with the aforementioned distribution of adhesive and separator distributed as hereinbefore described, then bagging by surrounding containing means 34 is accomplished as indicated in conventional manner with subsequent curing accomplished in an autoclave under heat and pressure also in conventional manner. The assembly is then debagged after curing and as shown in FIG. 7, sacrificial honeycomb core portion 16 is then removed by pulling from temporarily attached condition with higher density honeycomb core portion 14.

The aforementioned method of manufacture will yield dimensions between points 100 and points 102 (trailing and leading edges respectively of spar caps 32) which are the same to within about 0.010 inches with substantially parallel core machining and may be contrasted with tolerances achieved in accordance with state of the art techniques utilizing a machined mandrel, a technique hereinabove referenced.

In FIG. 8, the advantages of the aforementioned and tolerances achieved can be appreciated when bull nose 108 is required then to be assembled to spar caps 32 of finished honeycomb core assembly 10.

I claim:

1. A honeycomb core assembly useful in a process for simultaneously machining a plurality of surface portions of said honeycomb core assembly, said honeycomb core assembly comprising:
   - a honeycomb core blank having a low density portion and a higher density portion;
   - a sacrificial honeycomb core portion having a density less than said higher density portion of said honeycomb core blank;
   - temporary fastening means disposed between facing surface portions of said higher density portion of said honeycomb core blank and said sacrificial honeycomb core portion; and
   - said plurality of surface portions comprising a surface portion of said higher density portion and a surface portion of said sacrificial honeycomb core portion.

2. The invention according to claim 1 wherein said sacrificial honeycomb core portion includes a layer of material covering a surface portion thereof to prevent subsequent bonding thereof to another surface.

* * * * *